United States Patent [19]

Hornung et al.

[11] 4,213,077

[45] Jul. 15, 1980

[54] SPEED CONTROL CIRCUIT FOR A UNIVERSAL ELECTRIC MOTOR

[75] Inventors: Friedrich Hornung, Stuttgart; Martin Gerschner, Leinfelden-Echterdingen, both of Fed. Rep. of Germany

[73] Assignee: Robert Bosch GmbH, Stuttgart, Fed. Rep. of Germany

[21] Appl. No.: 936,324

[22] Filed: Aug. 24, 1978

[30] Foreign Application Priority Data

Sep. 15, 1977 [DE] Fed. Rep. of Germany ....... 2741525

[51] Int. Cl.² ........................................... H02K 23/00
[52] U.S. Cl. .................................... 318/245; 318/250; 318/316; 318/244; 318/512
[58] Field of Search ............... 318/244, 245, 246, 248, 318/249, 250, 268, 315, 316, 317, 343, 344, 512, 513; 323/48

[56] References Cited

U.S. PATENT DOCUMENTS

| | | | |
|---|---|---|---|
| 3,295,035 | 12/1966 | Field | 318/245 |
| 3,541,413 | 11/1970 | Conrad | 318/244 |
| 4,002,959 | 1/1977 | Schadlich | 318/245 |

Primary Examiner—J. V. Truhe
Assistant Examiner—John W. Redman
Attorney, Agent, or Firm—Frishauf, Holtz, Goodman & Woodward

[57] ABSTRACT

A transformer having a secondary winding that delivers a regulating magnitude to a speed regulator circuit that approaches zero as the speed approaches the speed setting, is provided with two primary windings wound and connected so that they oppose each other in operation. The first is the conventional primary winding in series with the universal motor of which the speed is being controlled (as by a conduction phase angle control of the input voltage) while the second primary winding is in series with a resistance and, in some cases, also with a capacitor, with this series combination being connected in parallel with the armature winding of the motor for the best regulation, or in parallel with the motor as a whole if it is important to avoid additional internal connections to the motor. The capacitor is used to compensate for the inductive reactance of the second primary winding in cases in which that reactance is not negligible. A second capacitor across the secondary filters out commution "hash."

18 Claims, 5 Drawing Figures

SPEED CONTROL CIRCUIT FOR A UNIVERSAL ELECTRIC MOTOR

This invention concerns a speed control circuit for a universal motor of the kind including a transformer having a primary winding in series with the motor and a secondary winding connected to the input of a regulating circuit.

Some speed control circuits of this kind are already known and offer considerable advantages compared with other known circuits in which the motor current is measured as a voltage across a series resistor interposed in the motor current circuit, because the heat dissipation is reduced to a minimum and at the same time there is the possibility, because of the presence of the transformer, of using a regulating circuit according to the phase-slicing principle for readily producing the correct input voltage.

It is known to utilize as input variables for a motor speed regulating circuit the following magnitudes dependent upon operating conditions of the motor: residual armature voltage, cos. $\phi$ armature or field voltage, voltage proportional to speed obtained through a tachogenerator, digital pulse signal proportional to speed obtained from tachogenerator, and commutation frequency derived through a pulse-shaping circuit.

The regulating magnitudes obtained by means of tachogenerators, pulse generators and pulse-shaping circuits make possible a relatively precise regulation, but on the other hand it involves so much expense for circuit components for obtaining and processing the regulating magnitude, that they are out of the question for simple electrical apparatus for everyday use, as for example electric tools for household or home shop use. Regulation by use of the other above-named regulating magnitudes are subject to serious deficiencies, so that they are unsuitable for a sufficiently stable speed control. In summary, it can therefore be stated that heretofore no regulating speed control could be developed for a universal motor that was really satisfactory, both from an economic standpoint and with regard to the effectiveness of its speed control.

SUMMARY OF THE INVENTION

It is an object of the present invention to provide a speed control for a universal motor by means of which a regulating magnitude can be obtained that makes possible an effective stabilization of the prescribed speed of the universal motor at small additional expense.

Briefly, a second primary winding wound so as to oppose the first primary winding is provided on the transformer and is connected in series with a resistance, the series combination being connected so as to be influenced by the voltage across at least one winding of the motor, preferably the armature voltage, and the two primary windings are so constituted that for a given value of resistance in series with the second primary winding, the magnetic fluxes respectively produced by the primary windings in the transformer core balance out at a prescribed operating condition of the motor.

The decisive advantage of the speed control circuit according to the invention thus consists in that the regulating magnitude is obtained not merely in dependence upon the motor current or the armature voltage, but instead in dependence upon the motor current and the voltage across at least one winding of the motor, preferably the armature winding. It has been found particularly advantageous to connect the series combination of the aforesaid resistance and the second primary winding directly in parallel with the armature winding of the motor. In principle, however, the invention comprehends the possibility of obtaining a good speed control by connecting the series combination of the aforesaid resistance and the second primary winding in parallel with the input terminals of the motor, which has the advantage that no supplementary terminals and internal connections therefor need be provided in a motor of existing production design. The latter advantage is however obtained at the expense of a somewhat reduced accuracy of speed regulation.

In a further elaboration of the invention, it has been found desirable to extend the series combination of the second primary winding and a resistance by the addition of a series capacitor, because in this manner the balancing of the magnetic fluxes can be obtained for any particular inductance of the second/primary winding over a suitable range of operating conditions in which the speed of the universal motor is to be regulated. It is also desirable to provide another capacitor in parallel to the secondary winding of the transformer for suppressing disturbing voltage peaks.

BRIEF DESCRIPTION OF THE DRAWINGS

The invention is further described by way of illustrative examples with reference to the annexed drawings, in which.

DESCRIPTION OF THE PREFERRED EMBODIMENTS

Figure 1:
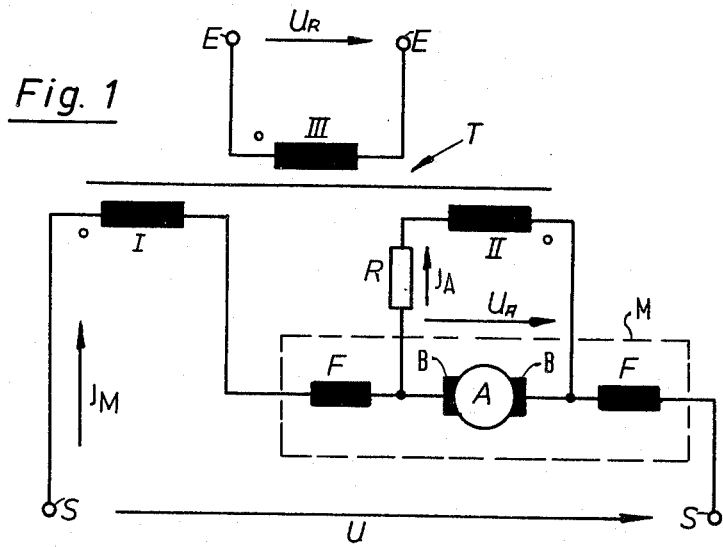
FIG. 1 is a circuit diagram of a preferred embodiment of a motor speed control circuit according to the invention.

FIG. 1 shows a motor M having a casing symbolized by a broken-line rectangle, within which are located an armature A connected through brushes B and a two-part field winding F. In addition, a transformer T is provided that has three windings, a first primary winding I in series with the motor M, a second primary winding II, and a second winding III. The motor current flows through the first primary winding I. The second primary winding II is connected in series with a resistance R and this series combination is connected in parallel to armature A of the motor M, which is to say in parallel to the armature winding. The two primary windings I and II are of course coupled in the usual way to the secondary winding III of the transformer T and the latter has its terminals E connected with the input terminals of a regulating circuit not shown in the drawing, which responds to the regulating magnitude provided by the secondary voltage $U_R$ to modify operation of the motor, as for example controlling the input voltage in a known way for maintaining the speed at a desired value within a rated load range.

In the circuit of FIG. 1, when the motor is operated at a supply voltage U, a current J is produced that flows both through the first primary winding 1 and through the motor M (it should be noted here that the voltages and currents are in practice, of course, alternating voltages and currents). Furthermore, in operation of the motor there is produced an armature voltage $U_A$ that depends upon the speed and load of the motor M, as the result of which a current $J_A$ is caused to flow through the series circuit consisting of the resistance R and the second primary winding II. The first primary winding I and the second primary II are wound so as to oppose each other, the direction of winding being indicated in the conventional way by dots in FIG. 1. The windings are so dimensioned, particularly in the number of turns, that taking account of the resistance value of the resistor R, the magnetic fluxes respectively generated in the transformer core will, at least to a large extent, balance out at a prescribed operating condition so that the voltage $U_R$ induced in the secondary winding III will be reduced substantially to zero. For all other operating conditions, however, there will be produced a voltage $U_R$ deviating from zero (the secondary winding III that will appear between the terminals E and can be supplied to a regulating circuit when not shown) as a regulating magnitude.

Figure 2:
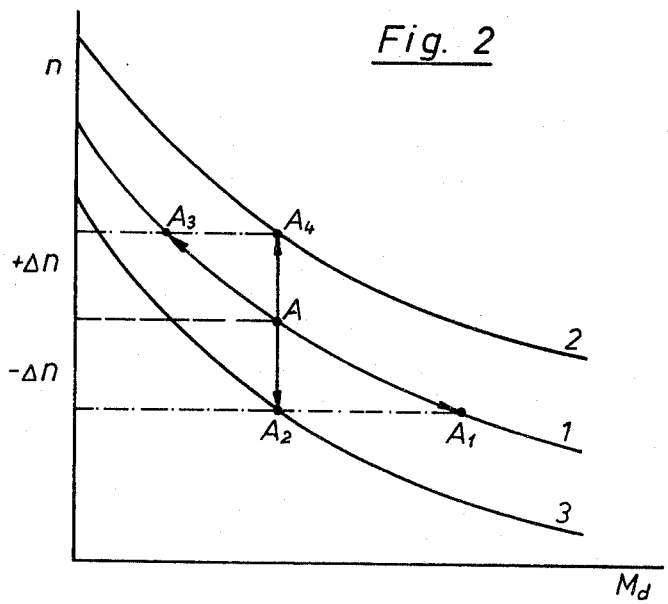
FIG. 2 is a diagram in which speed is plotted against torque for the operation of the circuit of FIG. 1.

In FIG. 2 of the drawings, three-speed torque operating characteristics 1-3 of a nonregulated universal motor are shown respectively for a moderate grading voltage (curve 1) for a higher operating voltage (curve 2) and a lower operating voltage (curve 3). The point $A_0$ is assumed to indicate in the diagram of FIG. 2 the operating point of the motor at a particular operating condition, for example, that operating condition at which, in accordance with the invention, the voltage $U_R$ is brought to zero. Basically, two disturbing magnitudes affect the operation of the universal motor, namely, changes in load and changes of supply voltage. An increase in load tends to shift the operating point of the motor from the point $A_0$ to the point $A_1$, whereas a decrease in operating voltage, of corresponding magnitude, produces a shift to the operating point $A_2$, a decrease in load to the operating point $A_3$, and an increase in operating voltage to the operating point $A_4$. In the first two cases, a reduction of speed is produced, whereas in the last two speed is increased, and in all cases by a speed difference $\Delta n$.

A change of operating condition for the motor which would produce a shift of the operating point $A_0$ to the operating point $A_1$ or $A_2$ has the effect, in the circuit according to the invention, of giving the flux produced in the transformer core by the first primary winding I a dominating influence, because the current J increases, or the armature voltage $U_A$ decreases, or both. In the secondary winding III of the transformer T, a voltage $U_R$ is consequently induced that has a plane relation with the operating voltage U corresponding to the cos. $\phi$ phase relation of the running motor.

In the case of a change of operating conditions that would produce a shift of the operating point of the motor from $A_0$ to $A_3$ or $A_4$, there results on the other hand a dominance the magnetic flux produced by the second primary winding II because the current J falls off, or the armature voltage $U_A$ increases, or both.

In consequence, there is induced in the secondary winding III a voltage $U_R$ that is shifted by 180° relative to that in the previously considered case (shift toward $A_1$ or $A_2$).

Figure 3:
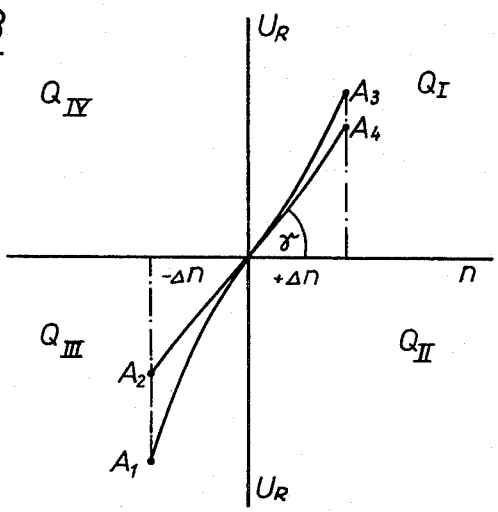
FIG. 3 is a diagram of the dependence of the regulating magnitude upon speed in the circuit of FIG. 1.

This relation between the speed n and the regulating magnitude or voltage $U_R$ across the secondary winding III brought out clearly in FIG. 3. It can there be seen that the secondary winding III, for every positive deviation in speed $+\Delta n$ delivers an increasing voltage $U_R$ with a first phase value independent of the cause of the speed increase; whereas, for a negative speed deviation $-\Delta n$ an increasing voltage $U_R$ with a phase value shifted by 180° from the former case is delivered, regardless of the cause of the speed decrease. The amplitude and phase of the voltage $U_R$ are therefore a measure for the magnitude and direction of the deviation in speed $\Delta n$ from the prescribed speed.

The regulating circuit for processing the regulating magnitude or voltage $U_R$ obtained in the manner above described now merely has the function of producing an increase in operating voltage under operating conditions corresponding to the first quadrant $Q_I$ of FIG. 3 and providing a reduction in operating voltage in the case of operating conditions that correspond to the third quadrant $Q_{III}$ of FIG. 3. In this manner all disturbing affects that can produce a deviation of the speed that is set are counteracted in the correct manner.

The steepness of the regulation characteristic can be influenced in the case of the speed control circuit of the present invention by corresponding choice of the transformation ratio between the first primary winding I and the secondary winding III, and this corresponds to the angle $\gamma$ in FIG. 3. With a sufficiently large transformation ratio, which is to say by corresponding choice of the turns ratio of the transformer, the change of the voltage $U_R$ produced by a speed deviation, for example resulting from an increase of motor load, will be so large that it is unnecessary to provide any additional amplification of the regulating magnitude.

In the above description of the operation of the circuit in accordance with the invention, the self-inductance (inductive reactance) of the second primary winding II was neglected. In the case of fast-operating universal motors for higher voltages, particularly for normal power wiring voltage, the second primary winding II would have to be provided with a large number of turns if the transformer T and the resistance R are to operate at low power consumption. In this case the inductive reactance of the second primary winding II can no longer be neglected. The current $J_A$ and the magnetic flux produced thereby are in this case shifted in phase relative to the motor current J so that there is no longer any operating condition at which the voltage $U_R$ across the secondary winding III can be brought to zero. Furthermore, substantial commutation disturbances are produced in universal motors operating at high speeds and these disturbances appear unweakened at the terminals of the secondary winding III, which is to say they are superimposed upon the regulating magnitude provided to the regulating circuit.

Figure 4:
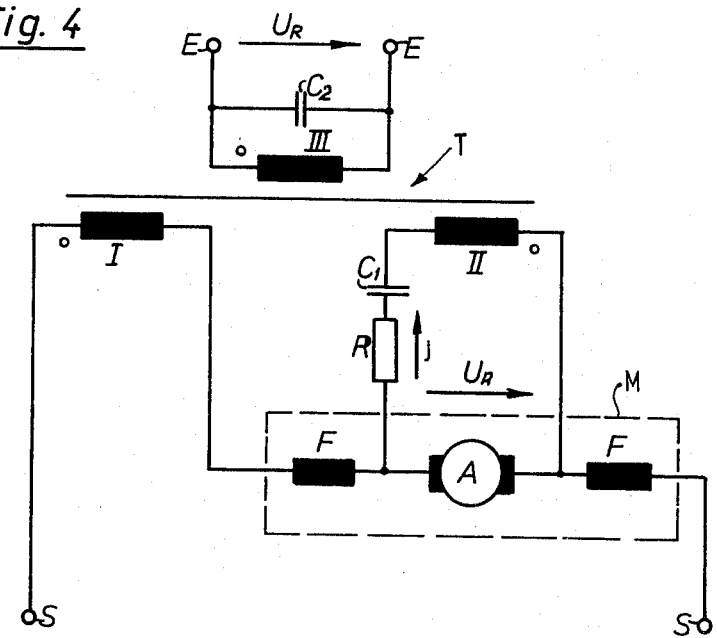
FIG. 4 is a modified embodiment of a motor speed control according to the invention.

In the embodiment shown in FIG. 4, the various difficulties that can arise on the basis of the interrelations above set forth are avoided by providing a capacitor $C_1$ in series with the resistance R and the second primary winding II. This capacitor has a capacitance of such a magnitude as to compensate the phase shift of the current $J_A$ that would be produced by the inductive reactance of the secondary primary winding II. The "hash" disturbances produced by commutation are suppressed in the circuit of FIG. 4 by a filter capacitor $C_2$ connected in parallel with the secondary winding III. In other respects, the circuit of FIG. 4 is constituted in the same manner as that of FIG. 1 so that the circuit of FIG. 4 does not need to further described.

In the circuits of FIG. 1 and FIG. 4, there is a certain disadvantage that the series circuit composed of the resistance R and the secondary winding II and, if provided, the capacitor C₁ must be connected by two separate conductors to put it in parallel with the armature A and these conductors must be brought to connections on the inside of the motor M. This disadvantage can be avoided if the series circuit branch just mentioned, instead of being connected in parallel with the armature A, is connected in parallel to the entire motor M, as shown in the embodiments illustrated in FIG. 5. This "purely mechanical" improvement involves some sacrifice of the quality of the regulating magnitude because load dependence change in the armature voltage has less affect on the regulating magnitude; whereas, variations in the voltage supply to the motor as a whole (the second cause of disturbing variation) remain fully effective.

Figure 5:
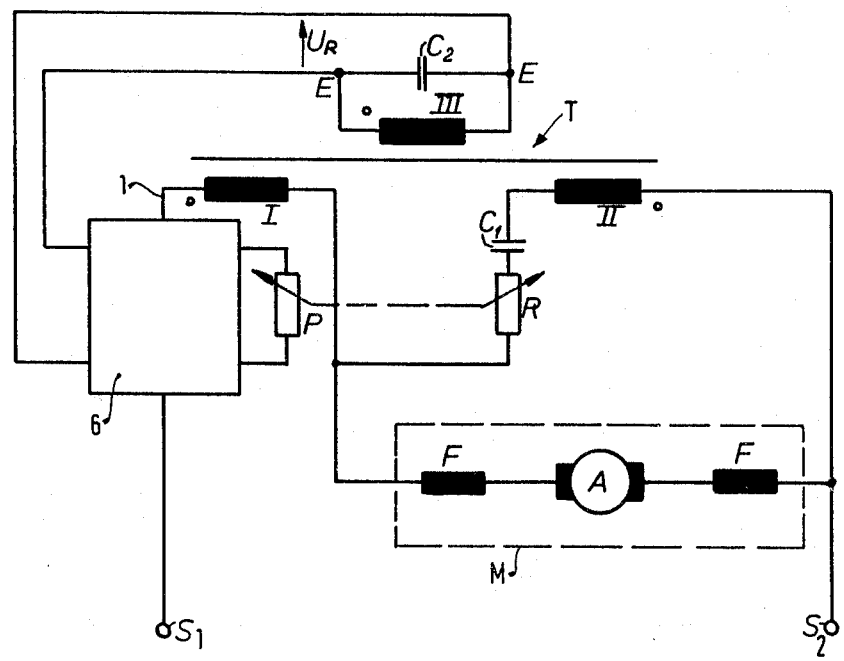
FIG. 5 is a further modified embodiment of a motor speed control circuit according to the invention, in this case showing the connection of the regulating circuit.

If it should be desired to set not merely one specific value of speed, but rather to make the speed adjustable over a certain range, then it is desirable to provide a regulating magnitude that will be free of any interfering base over the entire range of speed adjustment. Particularly in the case of running without load, it is often desirable for the regulating magnitude (i.e., the voltage $U_R$) to be zero for every speed that may be set and to take on a value deviating from zero only under changes in load or of supply voltage. This result can be obtained if the series resistance R, as shown in FIG. 5, is constituted as an adjustable resistance, preferably adjustable in common with a speed-setting potentiometer P of the regulating voltage, by mechanically ganging or otherwise mechanically coupling the variable resistance in series with the second primary winding II with the potentiometer P. The ganging of these two components for this purpose is so arranged that for every speed of running without load, there is a balancing out of the magnetic fluxes respectively produced by the two primary windings. Ganged potentiometers sometimes referred to as tandem potentiometers with resistance characteristics for the respective ganged sections designed to fit each other for this purpose are particularly suitable for this circuit. For a given speed-setting potentiometer, the appropriate "taper" of the variable resistance R of FIG. 5 can be determined by finding points on the curve corresponding to the balance condition in the transformer P. This type of adjustable speed control can of course also be utilized in the circuits of FIG. 1 and of FIG. 4.

From the foregoing description, it will be clear that the regulating magnitude obtained by means of the speed-control circuit of the present invention can be introduced in a variety of regulating circuit inputs, does not need to be amplified and is in practice free of any disturbing base magnitude since the balance for every desired operating point of the motor can be wound and has an unambiguous and strong dependence upon the speed and load conditions of the motor. The regulating magnitude can be obtained practically free of circuit losses, independent of the materials of which the motor is made and directly as an alternating current magnitude synchronous with the power frequency capable of operating directly on resistance-capacitance alternating current semi-conductor-firing circuits in the regulating circuit.

The regulating circuit shown in FIG. 5 (which could be similarly connected into FIG. 1 or into FIG. 4) is preferably one which regulates the phase angle during which the half waves of the supplied alternating current are permitted to flow through the motor, this being symbolized in FIG. 5 by a connection from the input terminals $S_1$ to the regulating circuit 6 which in practice continues through an appropriate semi-conductor wave-chopping circuit contained within the regulating circuit block 6 but not specifically shown in the drawing. The chopped supply current is connected by the lead 7 to the first primary winding I of the transformer T from which it passes to motor M and, in parallel thereto, also to the series circuit composed of the variable resistor R, the capacitor C₁ and the second primary winding II, to return to the other input voltage terminal $S_2$.

Suitable conduction-phase-angle a.c. voltage control circuits for this purpose are well known and illustrated, for example, in RCA-Corp., Thyristors Applikation-Note AN-3697, AN-3778

Furthermore, it can be determined by dimensioning of the circuit components whether the regulating magnitude should increase or decrease under load, as may be desired, or should increase up to a certain point, as the particular case may require. For this reason, the expression "operating condition", which can include the concept of a palscribed speed-load curve, is used herein to refer to the flux-balance criterion for the transformer T, although in most cases motor speed is likely to be used as the criterion over the functional range of the circuit.

In the various modifications in which the invention can be utilized to good effect, the motor speed control circuit of the invention can provide a regulating signal that is to a very great extent free of disturbances from commutation (FIG. 4) and even an arrangement in which not one connection to the interior of the motor is absolutely necessary (FIG. 5) and in which the possibility is provided to avoid interfering base magnitudes in the regulating magnitude over the entire range of adjustment of the regulating circuit (FIG. 5).

We claim:

1. A speed control circuit for a universal electric motor of the kind having a transformer of which a primary winding is connected in series with the motor and of which a secondary winding is connected with the input of a regulation circuit, further comprising the improvement which consists in that:
    said transformer has a second primary winding wound so as to oppose the first-mentioned primary winding and connected in series with a resistance, the series combination thereby formed being connected so as to be affected by the voltage across at least one winding of said motor, and
    said first and secondary primary windings are so constituted that for a given value of said resistance (R), they balance each other out, with respect to their effect on said secondary winding, at a predetermined operating condition of said motor.

2. A motor speed control circuit as defined in claim 1, in which said motor includes an armature winding and in which said series combination, including said second primary winding, is connected so as to be subject to the voltage ($U_A$) across said armature winding.

3. A motor speed control circuit as defined in claim 1, in which said motor has an armature winding and field windings, at least one field winding being in series with said armature winding, and in which said series combination including said second primary winding is connected so as to be subject to the voltage across the entire combination of said field and armature windings.

4. A motor speed control circuit as defined in claim 1, in which a capacitor ($C_1$) is connected in series with said second primary winding and said resistance.

5. A motor speed control circuit as defined in claim 2, in which a capacitor ($C_1$) is connected in series with said second primary winding and said resistance.

6. A motor speed control circuit as defined in claim 3, in which a capacitor ($C_1$) is connected in series with said second primary winding and said resistance.

7. A motor speed control circuit as defined in claim 4, in which a second capacitor ($C_2$) is connected in parallel with said secondary winding.

8. A motor speed control circuit as defined in claim 5, in which a second capacitor ($C_2$) is connected in parallel with said secondary winding.

9. A motor speed control circuit as defined in claim 6, in which said second capacitor ($C_2$) is connected in parallel with said secondary winding.

10. A motor speed control circuit as defined in claim 2, in which said resistance in series with said second primary winding is adjustable.

11. A motor speed control circuit as defined in claim 3, in which said resistance in series with said second primary winding is adjustable.

12. A motor speed control circuit as defined in claim 4, in which said resistance in series with said second primary winding is adjustable.

13. A motor speed control circuit as defined in claim 5, in which said resistance in series with said second primary winding is adjustable.

14. A motor speed control circuit as defined in claim 6, in which said resistance in series with said second primary winding is adjustable.

15. A motor speed control circuit as defined in claim 7, in which said resistance in series with said second primary winding is adjustable.

16. A motor speed control circuit as defined in claim 8, in which said resistance in series with said second primary winding is adjustable.

17. A motor speed control circuit as defined in claim 9, in which said resistance in series with said second primary winding is adjustable.

18. A motor speed control circuit as defined in any of claims 9–17, in which said regulation circuit includes a potentiometer connected for setting the motor speed and in which said adjustable resistor in series with said second primary winding is ganged with said potentiometer for simultaneous control of said adjustable resistance and of said potentiometer.

* * * * *